(12) United States Patent
Horner et al.

(10) Patent No.: US 7,588,523 B2
(45) Date of Patent: Sep. 15, 2009

(54) SEAM ROLLER AND TESTER FOR ROOFING MEMBRANE

(75) Inventors: Andrew J. Horner, Wadsworth, OH (US); Daryl J. Waite, Mentor, OH (US)

(73) Assignee: Everhard Products, Inc., Canton, OH (US)

( * ) Notice: Subject to any disclaimer, the term of this patent is extended or adjusted under 35 U.S.C. 154(b) by 719 days.

(21) Appl. No.: 11/252,867

(22) Filed: Oct. 18, 2005

(65) Prior Publication Data

US 2007/0084558 A1   Apr. 19, 2007

(51) Int. Cl.
*B05C 1/08* (2006.01)
*G01M 19/00* (2006.01)
(52) U.S. Cl. .................. 492/13; 492/19; 15/230.11; 7/167; 7/170; 81/45; 81/489; 156/574; 156/579; 29/407.01; 29/407.1
(58) Field of Classification Search ............... 492/13, 492/14, 19; 16/110.1; 15/230.11; 7/103, 7/167, 170; 81/45, 488, 489; 156/308.4, 156/574, 579; 29/407.01, 407.05, 407.1
See application file for complete search history.

(56) References Cited

U.S. PATENT DOCUMENTS

| | | | | |
|---|---|---|---|---|
| 2,197,154 A | * | 4/1940 | Miller | 299/37.4 |
| 3,085,270 A | * | 4/1963 | Vosbikian et. al. | 15/114 |
| 3,112,729 A | * | 12/1963 | Prezioso, Jr. | 15/230.11 |
| 3,702,739 A | * | 11/1972 | Rentfrow | 401/197 |
| 3,745,624 A | * | 7/1973 | Newman | 492/19 |
| 4,224,726 A | | 9/1980 | Walker | |
| 4,335,483 A | * | 6/1982 | Buck | 15/230.11 |
| 4,750,226 A | * | 6/1988 | Costill | 7/103 |
| 4,894,112 A | | 1/1990 | Lippman | |
| 5,203,852 A | * | 4/1993 | Downing et al. | 294/8.6 |
| 5,242,362 A | * | 9/1993 | Talamantez | 492/13 |
| 5,393,289 A | | 2/1995 | Green | |
| 5,543,003 A | * | 8/1996 | Regnier | 156/82 |
| 5,725,727 A | * | 3/1998 | Tutewohl | 156/579 |
| 6,049,970 A | * | 4/2000 | Reis et al. | 29/798 |
| 6,089,298 A | * | 7/2000 | Tutewohl | 156/579 |
| 6,685,609 B2 | * | 2/2004 | Carder | 492/13 |
| 6,875,162 B2 | * | 4/2005 | Barksdale et al. | 492/19 |
| D552,952 S | * | 10/2007 | Horner et al. | D8/51 |
| D556,526 S | * | 12/2007 | Horner et al. | D8/51 |

OTHER PUBLICATIONS

Everhard Products, Inc. brochure—1 page— document is undated but inventor believes the document is prior art.
ABC Supply Co. Inc. Catalog—1 page— Page No. 139— document is undated but inventor believes the document is prior art.

* cited by examiner

*Primary Examiner*—Essama Omgba
(74) *Attorney, Agent, or Firm*—Sand & Sebolt

(57) ABSTRACT

A hand tool for press-welding and sealing overlapping edges of roofing membrane sheets by a roller mounted on one end of a handle. A rigid rod extends outwardly from an opposite end of the handle and has a curved section and a rounded corner which terminates in an angled linear section ending in a distal end. The distal end is used as a pick to test the integrity of the formed seam and the curved section is used for applying pressure to specific areas on the seam. The tool can perform both functions of applying pressure to the sheets by the roller and then testing the integrity of the formed seam without requiring excessive reorientation or movement of the tool in the hand of an installer.

15 Claims, 4 Drawing Sheets

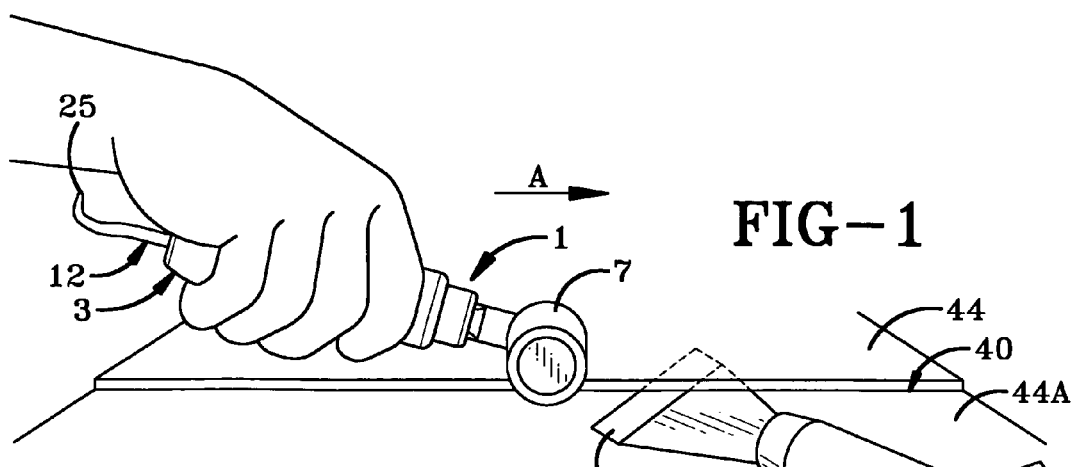
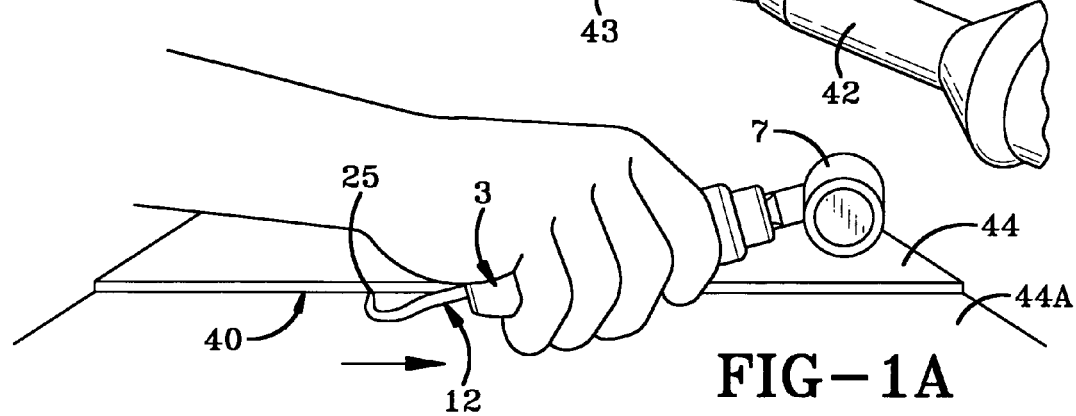
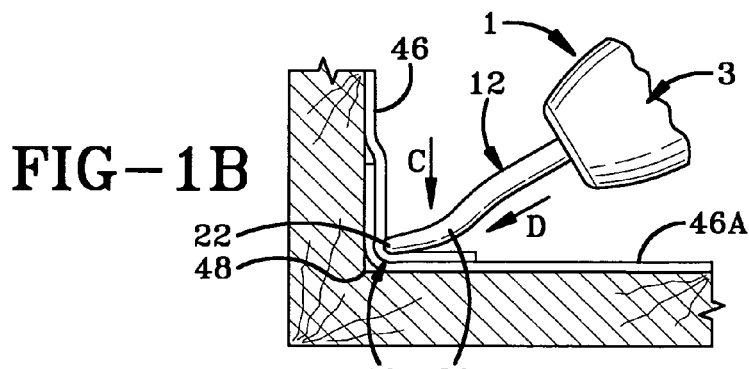
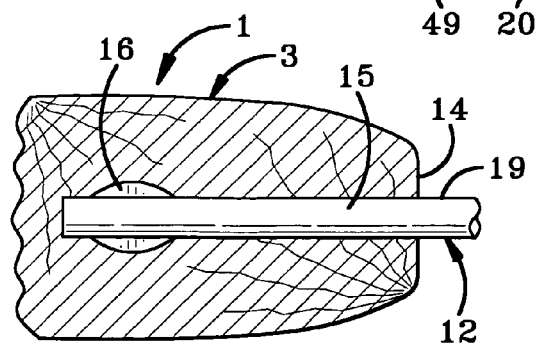
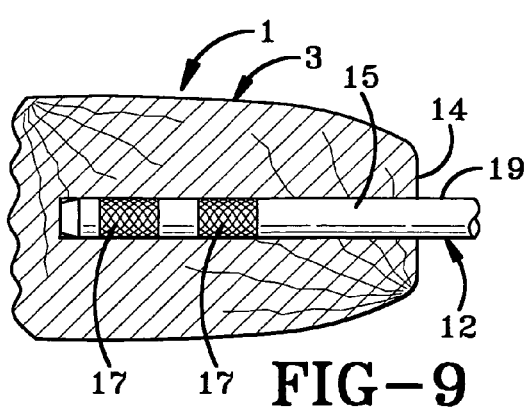

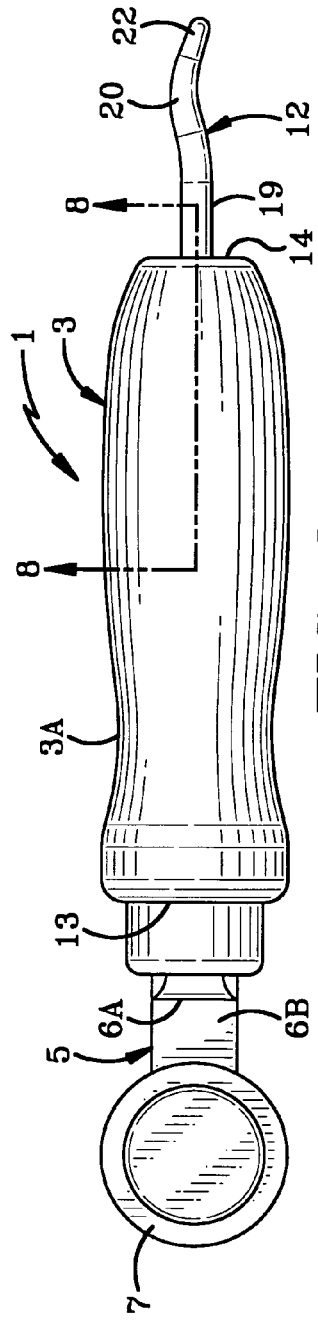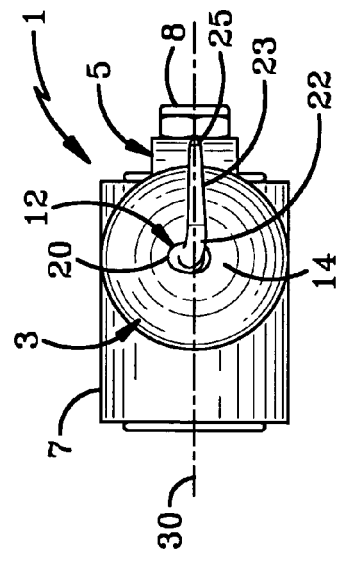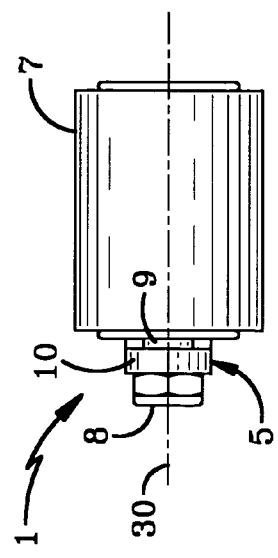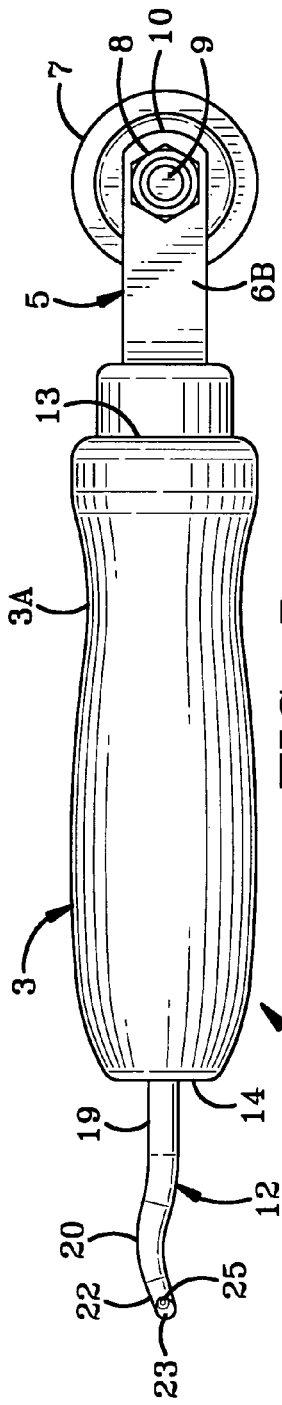
FIG-2
FIG-4
FIG-3
FIG-5

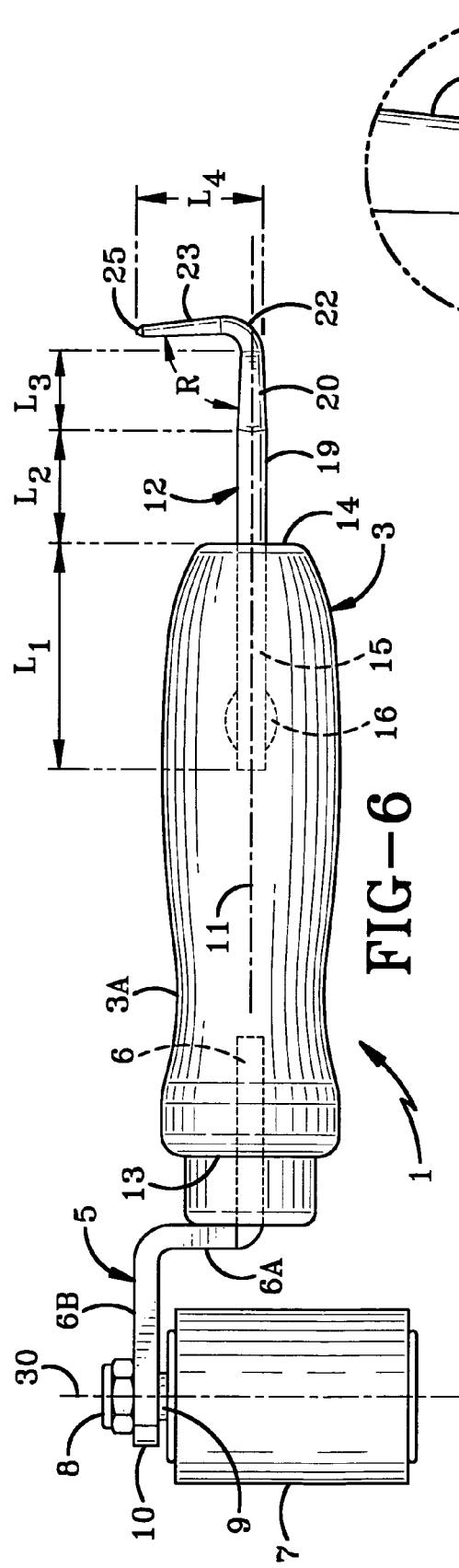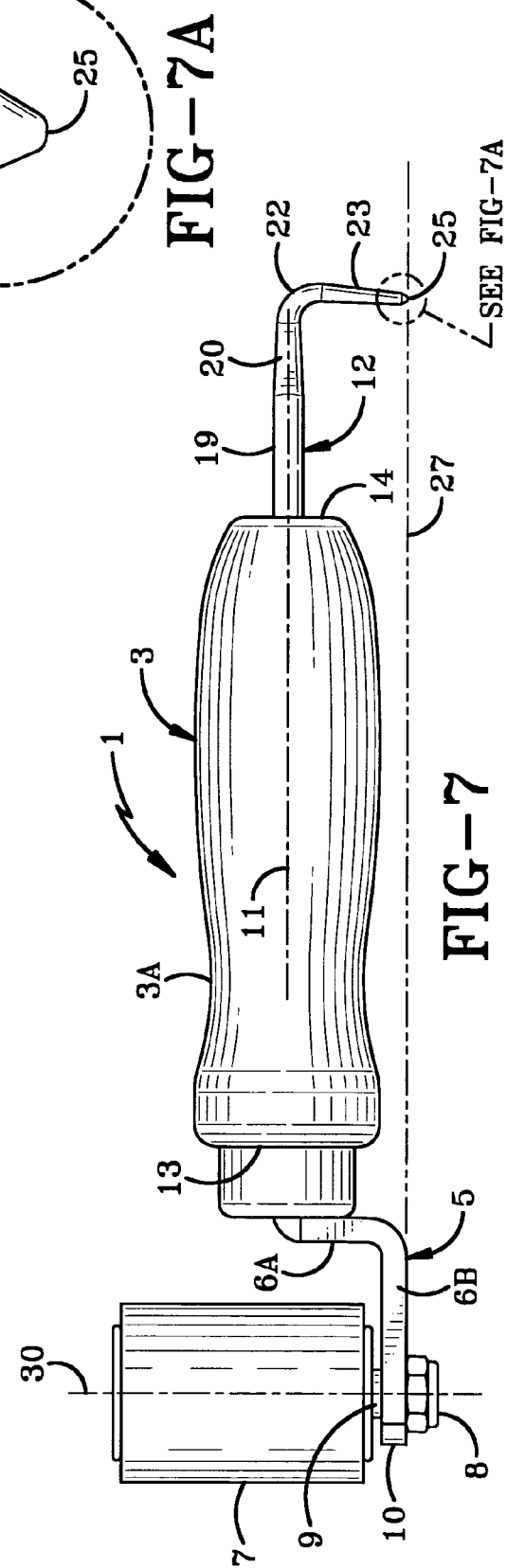

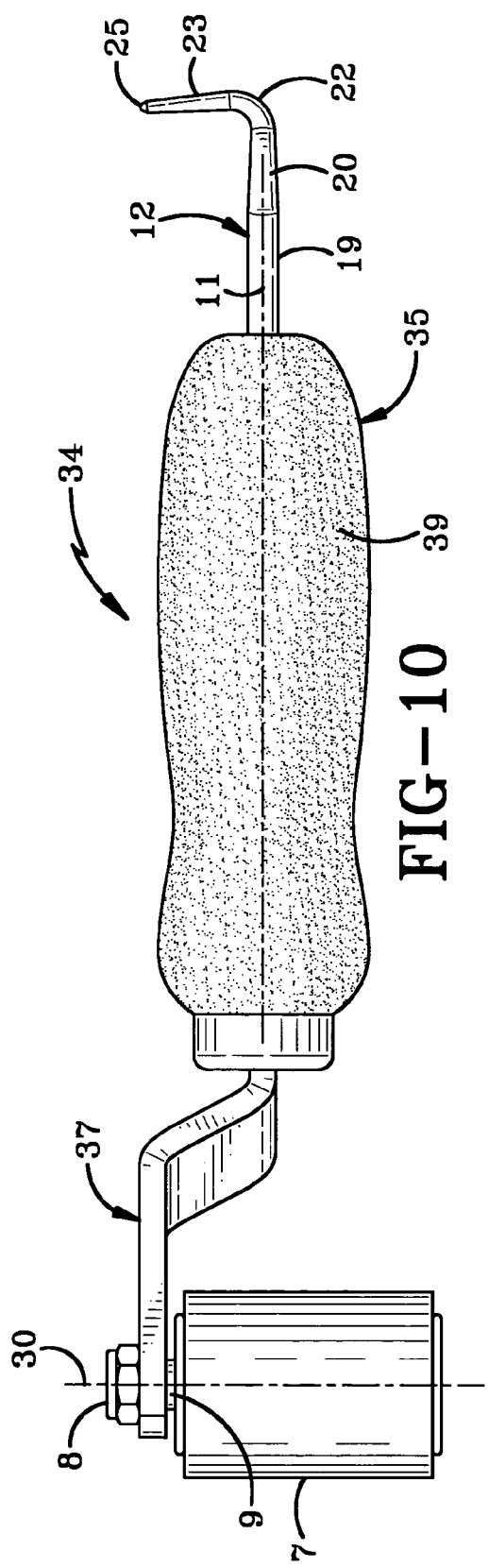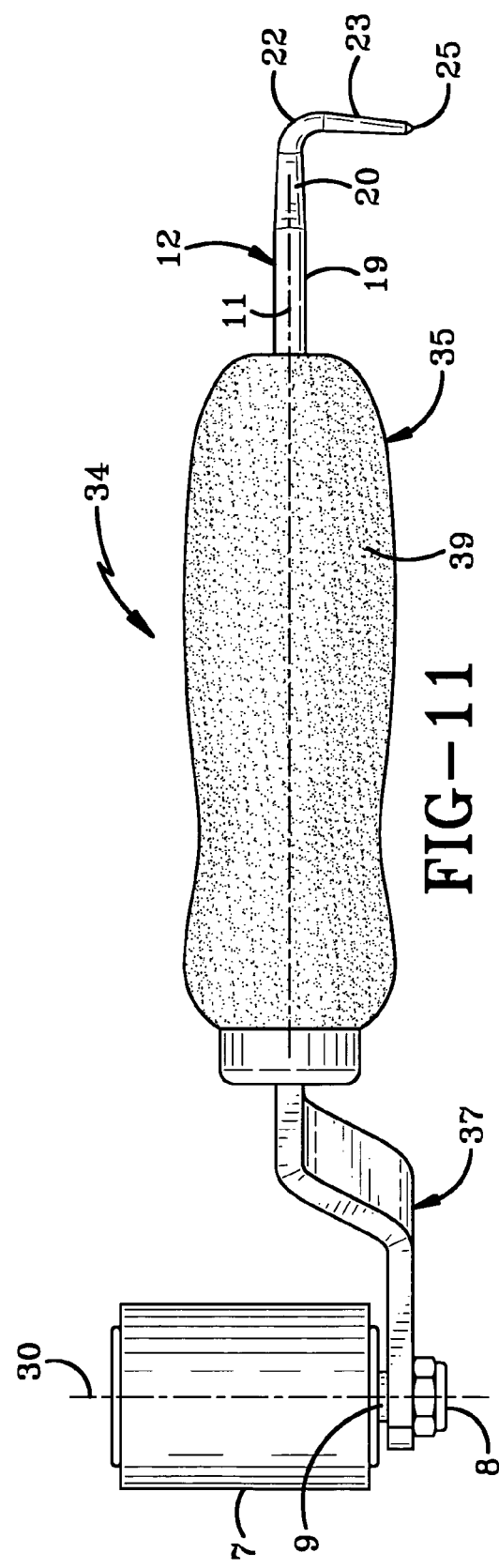

SEAM ROLLER AND TESTER FOR ROOFING MEMBRANE

BACKGROUND OF THE INVENTION

1. Technical Field

The invention relates to a method and apparatus for joining roofing membranes by press-welding overlapped heated edges of the membrane sheets together to form a sealed seam and then testing the integrity of the formed seam with a single tool.

2. Background Information

Sheets of roofing membrane are commonly used in many industrial and commercial roofing applications wherein large sheets of a waterproof membrane, are overlapped and then heated and pressed together to form a heat weld. These sheets are usually an elastomeric-type of material such as various rubber compositions, or thermoplastic sheets and the like. When done properly this method forms a strong water impervious seam which prevents subsequent peeling apart of the seam and prevents the penetration of water. Various types of devices have been developed for initially heating the edges of the overlapped membrane sheets, such as power propelled roller mechanisms which move along the seam and applies pressure to the overlapped sheets with a following roller. These machines work well for long flat seams but cannot function around many protrusions present on a roof.

In another type of apparatus and method, an installer using a hand-held heat gun such as disclosed in U.S. Pat. No. 4,894,112, presses the heated overlapped membrane sheets together by use of a hand roller which is moved along the heated edges. This manual heating of the overlapping membrane edges followed by the subsequent roller pressure applied thereto, is used at various locations on a roof, especially to form the overlapping joints around various protrusions and joints which occur on a roof such as around skylights, ducts, overhanging locations, corners, etc. It has been found that the locations around such protrusions and joints are more time-consuming to do properly and are more difficult to form the water impervious seam than in the flat straight seams. Thus, such seams and joints almost always will be formed with hand-held roller and hand-held heat applying gun.

The installer immediately after forming the heat welded seam, tests the integrity of the seam by using a separate pick tool. This tool usually includes a handle and a rigid rod extending outwardly therefrom and has a bent end, which is moved along the formed seam. If the seam is not formed correctly, the pick end will bite into the seam informing the installer that the seam is defective and will not pass inspection. However, in order to perform this seam testing, the operator is required to constantly manually replace the roller or heat gun with the seam testing tool. This requires constant manipulation and placing of one or both of the installation tools on the roof and picking up and using the seam testing tool during a roof membrane installation. This increases the time required for testing the seams and occasionally will result in the roof installer not correctly checking the roof seams which later will leak or not pass inspection.

Also, another problem is that if an improper seam is not immediately detected, the heated and softened elastomeric or thermoplastic material will harden and cannot be satisfactorily reheated and resealed requiring a subsequent hot patch to be placed thereon. Thus, if an improper seam can be detected immediately by the membrane installer, it can be immediately pressed together avoiding the use of a subsequent patch having to be applied thereto.

Therefore, the need exists in the roofing industry to provide a hand tool and method of use which enables an installer to press together heated overlapped heated edges of membrane sheets by moving a roller over the edges to form a seam, immediately followed by testing the seam with a pick-like tool without requiring the installer to continually manipulate several tools.

BRIEF SUMMARY OF THE INVENTION

One aspect of the present invention is to provide a hand-operated tool which includes a roller rotatably mounted on one end of a handle, which when moved over overlapped heated membrane sheet edges will pressure join the overlapped edges forming a waterproof seam. The tool includes a pick-like rod extending outwardly from an end of the handle opposite from the roller, enabling the installer to immediately test the integrity of the formed seam without requiring the installer to replace the pressure roller tool with a separate seam testing tool and without substantially reorienting the position of the tool in the operator's hand. This lessens operator fatigue and decreases the time required for properly forming a heat welded seam and the subsequent testing the seam integrity.

A further feature of the present invention is to provide such a hand tool in which a rigid rod extends outwardly from a handle and includes a curved portion which can be used for applying pressure at a particular difficult and tight location on a seam such as at a T-joint or corner, which is difficult to reach by the roller of the tool, to insure the proper formation of the seam at such difficult areas as around projections, overhangs, or other obstructions and protrusions usually found on a roof.

Another feature of the present invention is to provide such a hand tool in which the distal end of the seam-testing rod has a rounded configuration which provides the necessary structure for testing the seam, but which is not sharp enough to readily cut into the membrane resulting in damage thereto or accidentally injure the installer.

A still further feature of the present invention is that the distal end of the seam-tester lies in a plane generally parallel with the roller attachment mechanism to avoid the seam-testing pick end from extending too far outwardly from the tool thereby possibly injuring the installer or contacting adjacent membrane or other obstructions during use of the tool.

Another feature of the invention is to enable the distal end of the tool to be used as a pick to pull back flaps at joints to apply the heat gun at that location instead of heretofore requiring the operator to use his finger to pull back the overlapping heated joints subjecting the installer to possible burning due to the heated joint, and then enabling the curved portion of the testing tool to be used as a tamp to apply pressure to the heated overlapping joint areas usually located around protrusions and other difficult areas of a roof where the integrity of the seam is critical and more difficult to obtain. It also enables any seam defects to be located immediately by the installer and corrected while the seam is hot avoiding a patch to be applied later.

These objectives and advantages are obtained by the improved hand tool of the present invention, the general nature of which may be stated as comprising a handle body having front and back ends; a roller attached to and extending outwardly from the front end of the handle; and a rod having an angled end extending outwardly from the back end of the handle.

These objectives and features are further obtained by the method of the present invention, the general nature of which may be stated as including the steps of providing a hand-held tool having a handle with a roller at one end and a rod terminating in an angled end extending outwardly from an opposite end of the handle; heating overlapping roofing membrane sheets near the edges of the sheets; applying pressure to the heated overlapping sheets by manually moving the roller along the edges of the overlapping sheets to form a sealed seam; and moving the hooked end of the hand tool along the formed seam to test the integrity of the seam.

BRIEF DESCRIPTION OF THE SEVERAL
VIEWS OF THE DRAWINGS

A preferred embodiment of the invention, illustrated of the best mode in which Applicant contemplates applying the principles, is set forth in the following description and is shown in the drawings and is particularly and distinctly pointed out and set forth in the appended claims.

FIG. 1 is a diagrammatic perspective view showing overlapped membrane sheets being heated and pressure rolled to form a seam by the tool of the present invention.

FIG. 1A is a diagrammatic perspective view showing the pick-end of the present invention testing the integrity of the formed seam of FIG. 1.

FIG. 1B is a diagrammatic view of a roof decking shown in section, and the curved end of the tool being used to apply pressure at a seam.

FIG. 2 is a side elevational view of a first embodiment of the tool of the present invention.

FIG. 3 is a left end view of FIG. 2.

FIG. 4 is a right end view of FIG. 2.

FIG. 5 is an opposite side elevational view from that of FIG. 2.

FIG. 6 is a top plan view of the hand tool as shown in FIG. 2.

FIG. 7 is a bottom plan view of the hand tool as shown in FIG. 2.

FIG. 7A is a greatly enlarged view of the distal end of the rod of the encircled portion of FIG. 7.

FIG. 8 is an enlarged fragmentary sectional view taken on line 8-8, FIG. 2.

FIG. 9 is a view similar to FIG. 8 showing a modified manner of attaching the pick rod in the handle of the tool.

FIG. 10 is a top plan view similar to FIG. 6 of a modified embodiment of the hand tool of the present invention.

FIG. 11 is a side elevational view of the modified hand tool of FIG. 10.

Similar numerals refer to similar parts throughout the drawings.

DETAILED DESCRIPTION OF THE INVENTION

The improved hand tool of the present invention is indicated generally at 1, and is shown in FIGS. 1-1A forming a heat welded seam along a straight portion of a roof deck and the subsequent testing thereof, and subsequently used to form a joint seam at a corner of a protrusion on the roof as shown in FIG. 1B. A first embodiment of hand tool 1 is shown in FIGS. 2-7.

Tool 1 includes a rigid handle 3 which may be formed of wood or other type of material, preferably having a generally cylindrical configuration with a slight indented annular area 3A formed therein to provide an ergonomic configuration to the handle. A Z-shaped roller mounting bracket indicated generally at 5 (FIGS. 6 and 7), and includes a first leg 6 which is mounted in and extends outwardly from a front end 13 of handle 3 along the longitudinal axis 11 of handle 3. Bracket 5 has second leg 6A extending at right angles to leg 6 and has a third leg 6B. Leg 6B extends at a right angle to leg 6A and is parallel to leg 6, and is spaced from and parallel with longitudinal axis 11 of handle 3. A roller 7 is rotatably mounted on a shaft 9 which extends in a cantilever fashion outwardly from outer end 10 of bracket leg 6B. Shaft 9 may be attached to bracket leg by 6B by a nut 8 or other type of attachments. Roller 7 usually is formed of an elastomeric or plastic type material well known in the roofing industry, and is rotatably mounted on fixed shaft 9 by internal bearing (not shown), a construction well known in the art.

In accordance with the invention, a rod indicated generally at 12, is mounted in and extends outwardly from a back end 14 of handle 3. Rod 12 includes an inner mounting section 15 ($L_1$) (FIG. 6) which can be securely mounted in handle 3 by a pair of flared tabs 16 (FIG. 8), or in an alternate embodiment by knurled areas 17 as shown in FIG. 9. These attachments prevent rod 12 from moving or rotating with respect to handle 3 forming a secure rigid means of attachment thereto. Other types of attachments than those shown in FIGS. 8 and 9 can be utilized without affecting the invention.

Rod 12 further includes a generally straight linear section 19 ($L_2$) extending outwardly from mounting section 15 and an adjacent slightly curved concave section 20 ($L_3$) which merges into a curved corner 22. Corner 22 forms an angle of approximately 85° (R) with curved section 20 as shown in FIG. 6 and terminates in a tapered straight linear pick section 23 which terminates in a rounded distal end 25. Rod 12 preferably is a one piece member formed of 1045-1060 cold rolled steel with sections 15 and 19 having a diameter of approximately 0.25 inches, and with curved section 20 having a slight taper of approximately 2.5 degrees. Straight linear section 23 which forms the pick end portion of rod 12 preferably has a slight taper thereto and extends generally parallel to the axis of roller 7 but in an opposite direction from longitudinal axis 11 as best shown in FIG. 6. Distal end 25 is generally rounded as shown in FIG. 7A to avoid a sharp point thereon which could cut into the membrane while testing the integrity of the formed seam.

In the preferred embodiment handle 3 is approximately 5 inches long with the overall length of rod 12 being approximately 4 inches with mounting section 15 ($L_1$) being approximately 2.0 inches and linear section 19 and curved section 20 being approximately 2 inches in combined length. Pick section 23 preferably has a length ($L_4$) slightly greater than 1 inch, for example 1.12 inches. However, these dimensions can vary without affecting the concept of the invention.

As shown in FIG. 7, pick distal end 25 preferably lies in a plane 27 which when parallel with a longitudinal plane containing longitudinal axis 11, coincides with or inwardly of the outer dimension of the tool as defined by attachment nut 8 of roller mounting shafting 9. This avoids the pick or section 23 being excessively long but still provides sufficient length thereto for performing the seam testing procedure described below. Furthermore, pick section 23 extends generally parallel with longitudinal axis 30 of roller 7 as shown in FIG. 7, and extends in the opposite direction from handle 3 as does roller 7 from bracket 5.

A slightly modified version or second embodiment of the hand tool of the present invention is indicated generally at 34, and is shown in FIGS. 10 and 11. Hand tool 34 includes the same rod 12 extending outwardly from the rear end of a handle 35 with one of the differences being a modified bracket 37. Bracket 37 for mounting roller 7 on the front end of handle 35 has a slightly elongated Z-shaped configuration than bracket 5. Also handle 35 may be formed of a different material than handle 3 and is covered with a soft cushioning material 39. However, the basic manner of use of tool 34 is the same as tool 1 as described herein, and thus is not described in further detail.

The method of use of the hand tool of the present invention is best illustrated in FIGS. 1-1B. FIG. 1 shows a usual manner of forming a heated seam 40 wherein a source of heat such as a heat gun 42, supplies heat from a nozzle 43, to a pair of overlapping roofing membrane sheets 44 and 44A. The heated overlapped heated sheets are then pressed together to form the heat welded seam 40 by pressure being applied thereto by roller 7. Immediately after forming a section of heat welded seam 40 by applying downward pressure thereon by rolling roller 7 along the heating seam in the direction of arrow A, the installer merely pivots tool 1 from the position in FIG. 1 to the position shown in FIG. 1A, and moves distal end 25 of pick rod 12 along the formed seam in order to determine the integrity of the seam. Thus, the installer forms the heated seam as shown in FIG. 1 by use of the hand tool roller as is presently done in the roofing industry, and instead of replacing tool 1 with a separate pick as heretofor required, slightly pivots the angle of the hand tool from the position of FIG. 1 to that of FIG. 1A, and then moves distal end 25 of rod 12 along the formed seam.

The installer then reapplies the heat gun 42 to another portion of the overlapped membrane sheets followed by the downward rolling pressure of roller 7 to form another length of rolled seam. Thus it is easily seen that this expedites the forming and testing of the seam without requiring the installer to constantly replace hand tool 1 with a separate pick tool for testing the integrity of the formed seam.

In accordance with another feature of the invention, rounded corner 22 of rod 12 can be used as a tamp for applying pressure either downwardly in the direction of arrow C (FIG. 1B) or in the direction of arrow D to form a heat welded seam at a particularly tight joint or detailed area of overlapping membranes 46 and 46A. These detailed seams occur at various corners and joints around protrusions found on most roof structures. These tight locations such as corner 48, cannot be reached for applying pressure thereto by roller 7. Curved section 20 of rod 12 provides for a smooth area in which the installer can place his thumb or finger if desired, for applying pressure in the directions of arrows C and/or D for pressing rounded corner 22 of rod 12 tightly against the overlapped seams. Also not illustrated in the drawings, pick end 25 of the rod can be used to test the integrity of seam 49 formed at corner 48 without requiring replacement of tool 1 by a separate pick tool. Also, should seam 49 be found to be defective, it can be easily corrected by immediately applying force thereto by curved corner 22 or by the straight linear section 23 of the pick end of rod 12 avoiding the use of a hot patch repair.

Thus, improved hand tool 1 and modified embodiment 35, provides a tool which greatly facilitates the installation and subsequent testing of a heat formed seam of overlapping roofing membrane sheets, as well as at various joints formed between the overlapped membrane sheets at various roof protrusions, without requiring the constant replacing pressure roller with a pick tool and then back to a roller, etc. This increases the speed and ease of roof installations while ensuring that the seams are properly tested and if found defective, can be immediately corrected by rerolling or using the rounded end of the pick as a tamp to correct the defective seam. All of these features and advantages are obtained by a simple hand tool having the pressure applying roller at one end and a pick-like rod extending outwardly from the other end having a configuration generally similar to that as described above. It is readily understood that rod 12 can have other configurations than that described above without effecting the concept of the invention.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

The invention claimed is:

1. A hand tool for rolling and testing roofing membrane seams, said hand tool comprising:
a handle having front and back ends;
a roller mounting bracket extending outwardly from the front end of the handle, said bracket having at least first and second legs, said first leg being embedded in the front end of the handle and the second leg being offset from the first leg and extending generally parallel with and spaced from a longitudinal axis of the handle;
a shaft attached to the second leg of the roller mounting bracket;
a roller rotatably mounted on the shaft;
a rod having a mounting end embedded in and extending outwardly from the back end of the handle, said rod having a straight linear section extending substantially along the longitudinal axis of the handle and terminating in a curved concave section which merges into a rounded corner and then into and terminating in a rounded distal end.

2. The hand tool defined in claim 1 wherein the handle is substantially cylindrical.

3. The hand tool defined in claim 1 wherein the roller shaft is attached to the second leg of the roller mounting bracket by a connector; in which a distal end of the rod lies in an imaginary plane extending substantially parallel with a plane containing the longitudinal axis of the handle; and in which the imaginary plane of the distal end coincides with or is inwardly of an outermost end of the connector.

4. The hand tool defined in claim 1 wherein the rod is formed of cold rolled steel with the linear section being cylindrical having a diameter of approximately 0.25 inches.

5. The hand tool defined in claim 1 wherein the rod mounting end includes at least one outwardly flared tab.

6. The hand tool defined in claim 1 wherein the rod mounting end includes at least one knurled area.

7. The hand tool defined in claim 1 wherein the rounded corner has a radius of curvature of approximately 85°.

8. The hand tool defined in claim 1 wherein the straight linear section of the rod has a length slightly greater than one inch.

9. The hand tool defined in claim 1 wherein the roller mounting shaft extends at a substantially right angle to the longitudinal axis of the handle; and in which the straight linear section of the rod extends substantially at a right angle to the longitudinal axis of the handle in an opposite direction to the roller shaft.

10. The hand tool defined in claim 1 wherein the rod is a one-piece member formed of 1045-1060 cold roll steel.

11. A method of joining overlapping sheets of sealable material and testing the integrity of a seam formed thereby, said method comprising the steps of:
 (a) providing a hand-held tool having a handle with a roller rotatably mounted at one end and a rod terminating in an angled end extending outwardly from at an opposite end of the handle;
 (b) heating the overlapping sheets near the edges of the sheets;
 (c) applying pressure to the heated overlapping sheets by manually moving the roller along the edges of the overlapping sheets to form a sealed seam; and
 (d) moving the angled end of the hand tool along the formed seam to test the integrity of the seam.

12. The method defined in claim 11 including the steps of:
 forming the rod with a straight linear section terminating in a rounded corner which merges into the angled end; and applying pressure to the formed seam with the rounded corner of the rod.

13. The method defined in claim 12 including the steps of providing the rod with a curved section between the linear section and rounded corner; and applying pressure to a formed seam by the angled end by manually applying pressure to the rod at the curved section.

14. The method defined in claim 11 including performing steps (c) and (d) without repositioning the tool in the hand of an installer.

15. The method defined in claim 11 including performing steps (c) and (d) by only changing the angle of the tool with respect to the formed seam.

* * * * *